United States Patent
Sasaki et al.

(10) Patent No.: US 7,588,121 B2
(45) Date of Patent: Sep. 15, 2009

(54) FLEXIBLE POLYURETHANE FOAM AND PROCESS FOR ITS PRODUCTION

(75) Inventors: Takayuki Sasaki, Ibaraki (JP); Shigeo Hatano, Ibaraki (JP); Yoshinori Toyota, Ibaraki (JP); Katsuji Kuribayashi, Ibaraki (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/210,509

(22) Filed: Sep. 15, 2008

(65) Prior Publication Data

US 2009/0008595 A1    Jan. 8, 2009

Related U.S. Application Data

(63) Continuation of application No. 11/375,012, filed on Mar. 15, 2006, which is a continuation of application No. PCT/JP2004/013668, filed on Sep. 17, 2004.

(30) Foreign Application Priority Data

Sep. 19, 2003  (JP)  ............................. 2003-327588

(51) Int. Cl.
  *G10K 11/00* (2006.01)
  *E04B 1/74* (2006.01)
  *C08G 18/00* (2006.01)

(52) U.S. Cl. .................. 181/180; 180/175; 252/62; 521/170; 521/174

(58) Field of Classification Search ............... 521/174, 521/170; 181/175, 180; 252/62
See application file for complete search history.

(56) References Cited

U.S. PATENT DOCUMENTS

| | | | |
|---|---|---|---|
| 5,093,380 A | 3/1992 | Takeyasu et al. | |
| 5,266,143 A * | 11/1993 | Albera et al. | ............... 156/245 |
| 5,420,170 A | 5/1995 | Lutter et al. | |
| 6,291,538 B1 | 9/2001 | Okubo et al. | |
| 6,313,060 B1 | 11/2001 | Sugiyama et al. | |
| 6,653,362 B2 | 11/2003 | Toyota et al. | |
| 6,734,219 B2 | 5/2004 | Wada et al. | |
| 6,756,415 B2 | 6/2004 | Kimura et al. | |
| 6,759,448 B2 | 7/2004 | Toyota et al. | |
| 6,815,467 B2 | 11/2004 | Toyota et al. | |
| 7,388,036 B2 | 6/2008 | Sasaki et al. | |
| 7,388,037 B2 | 6/2008 | Sasaki et al. | |
| 2001/0031797 A1 | 10/2001 | Kuwamura et al. | |
| 2004/0152797 A1 | 8/2004 | Wada et al. | |
| 2004/0229970 A1 | 11/2004 | Sasaki et al. | |
| 2007/0213420 A1 | 9/2007 | Kimura et al. | |
| 2007/0219284 A1 | 9/2007 | Sasaki et al. | |
| 2008/0081846 A1 | 4/2008 | Sasaki et al. | |
| 2008/0081847 A1 | 4/2008 | Sasaki et al. | |
| 2008/0085945 A1 | 4/2008 | Sasaki et al. | |
| 2008/0114088 A1 | 5/2008 | Sasaki et al. | |
| 2008/0176970 A1 | 7/2008 | Sasaki et al. | |

FOREIGN PATENT DOCUMENTS

| | | |
|---|---|---|
| EP | 1 022 300 A1 | 7/2000 |
| JP | 59-98121 | 6/1984 |
| JP | 5-209036 | 8/1993 |
| JP | 7-59389 | 6/1995 |
| JP | 8-176258 | 7/1996 |
| JP | 8-231676 | 9/1996 |
| JP | 10-121597 | 5/1998 |
| JP | 2002-265555 | 9/2002 |
| JP | 2002-322230 | 11/2002 |
| WO | WO 01/21682 A1 | 3/2001 |

OTHER PUBLICATIONS

U.S. Appl. No. 12/210,509, filed Sep. 15, 2008, Sasaki et al.
U.S. Appl. No. 12/200,145, filed Aug. 28, 2008, Sasaki et al.

* cited by examiner

*Primary Examiner*—Mark Eashoo
*Assistant Examiner*—Melissa Winkler
(74) *Attorney, Agent, or Firm*—Oblon, Spivak, McClelland, Maier & Neustadt, P.C.

(57) ABSTRACT

To provide a flexible polyurethane foam having improved sound absorbing properties in a low frequency region.

A process for producing a flexible polyurethane foam which comprises foaming a starting material composition (E) comprising a high molecular weight polyoxyalkylene polyol (A), an organic polyisocyanate compound (B), a blowing agent (C) and a catalyst (D) in a closed mold, characterized in that at least a part of the high molecular weight polyoxyalkylene polyol (A) is a polyoxyalkylene polyol (p) having at least two hydroxyl groups on the average and having a molecular weight (Mc) per hydroxyl group of from 1,800 to 2,800 and a total unsaturation value (USV) of at most 0.08 meq/g, and that the air flowability of a flexible polyurethane foam obtained by foaming the starting material composition (E) in a thickness of 26 mm, is at most 0.085 $m^3$/min.

8 Claims, No Drawings

FLEXIBLE POLYURETHANE FOAM AND PROCESS FOR ITS PRODUCTION

TECHNICAL FIELD

The present invention relates to a flexible polyurethane foam having good sound absorbing properties over a wide range of from low frequency to medium frequency and a process for its production. Such a polyurethane foam has excellent sound absorbing properties, and when it is used as a soundproofing material for automobiles, it is unnecessary to use it in combination with a thermoplastic base material as required heretofore. Further, it shows excellent soundproofing performance when used alone, and thus it is effective for weight reduction of automobiles.

BACKGROUND ART

Heretofore, it has been common that a soundproofing material for the purpose of sound absorption or sound insulation is mounted at a dashboard portion partitioning a vehicle interior from an engine room of an automobile to take a measure to prevent intrusion of vibration or noise from the engine room into the vehicle interior. As such a soundproofing material, one having a sound insulator such as a rubber, polypropylene sheet or vinyl chloride sheet integrated on a sound absorbing material made of a porous material such as polyester fiber or flexible polyurethane foam (hereinafter referred to also as a flexible foam), has been used. Especially, a flexible foam has a merit in that it can be produced inexpensively as compared with a polyester fiber and thus has been used as a sound absorbing material. For example, Patent Document 1 discloses a flexible foam having specific levels of air flowability and hardness, and a process for its production. Further, Patent Document 2 discloses a process for producing a flexible foam which is light in weight and excellent in the soundproofing performance.

However, a conventional flexible foam has been inadequate in the sound-absorbing performance in a low frequency region by itself and thus has had a problem that it is necessary to take a measure to improve the sound insulating property, for example, by bonding to the flexible foam a thermoplastic material such as a rubber containing a polyolefin as the main component. This in turn has led to a further problem that it is required to consider the adhesion between the flexible foam and the thermoplastic material, or that the mass will increase. Patent Document 3 proposes a soundproofing material made of a flexible foam alone, which shows excellent sound absorbing performance in a range of from a medium frequency to high frequency (at least 2,000 Hz), but it has had a problem that the sound absorbing performance is inadequate in a low frequency region of at most 1,000 Hz, particularly at most 500 Hz.

Patent Document 1: JP-B-7-59389
Patent Document 2: JP-A-5-209036
Patent Document 3: JP-A-10-121597

DISCLOSURE OF THE INVENTION

Object to be Accomplished by the Invention

Under the circumstances, the present invention provides a process for producing a flexible polyurethane foam having improved the low frequency sound absorbing performance which used to be inadequate. Particularly, it provides a process for producing a flexible polyurethane foam which is a flexible foam having good sound absorbing performance over a wide range of from low frequency to medium frequency and which can be used as a soundproofing material for automobiles without being used in combination with another material.

Means to Accomplish the Object

The present inventors have found that by controlling the air flowability of a flexible polyurethane foam, the sound absorbing performance in a region of from low frequency to medium frequency can be increased, and the present invention has been accomplished. Namely, the present invention provides the following:

A process for producing a flexible polyurethane foam which comprises foaming a starting material composition (E) comprising a high molecular weight polyoxyalkylene polyol (A), an organic polyisocyanate compound (B), a blowing agent (C) and a catalyst (D) in a closed mold, characterized in that at least a part of the high molecular weight polyoxyalkylene polyol (A) is a polyoxyalkylene polyol (p) having at least two hydroxyl groups on the average and having a molecular weight (Mc) per hydroxyl group of from 1,800 to 2,800 and a total unsaturation value (USV) of at most 0.08 meq/g, and that the air flowability of a flexible polyurethane foam obtained by foaming the starting material composition (E) in a thickness of 26 mm, is at most 0.085 $m^3$/min; a soundproofing flexible polyurethane foam to be obtained by such a process; and a flexible polyurethane foam for an interior material for automobiles.

EFFECTS OF THE INVENTION

The flexible polyurethane foam obtained by the present invention shows improved sound absorbing performance in a low frequency region in the vicinity of 500 Hz and thus is suitable as a soundproofing material for buildings or vehicles. Particularly, the flexible polyurethane foam according to the present invention is useful by itself as a soundproofing material for automobiles and thus is effective also for the weight reduction of automobiles.

BEST MODE FOR CARRYING OUT THE INVENTION

High Molecular Weight Polyoxyalkylene Polyol (A)

In the present invention, a high molecular weight polyoxyalkylene polyol (A) (hereinafter referred to simply as the polyol (A)) is used. The polyol (A) in the present invention is preferably one obtained by ring opening addition polymerization of an alkylene oxide in the presence of an initiator and a catalyst, and it is preferred that the average number of hydroxyl groups is at least 2, and the molecular weight (Mc) per hydroxyl group is at least 500.

The polyol (A) preferably has a molecular weight (Mc) per hydroxyl group of from 500 to 5,000, more preferably from 800 to 2,800, particularly preferably from 850 to 2,500. Further, the polyol (A) may be a mixture of high molecular weight polyoxyalkylene polyols having molecular weights (Mc) per hydroxyl group of at least 500, and in such a case, the average of the molecular weights (Mc) per hydroxyl group is preferably from 500 to 5,000, more preferably from 800 to 2,800, particularly preferably from 850 to 2,500.

If the average of the molecular weights (Mc) per hydroxyl group is smaller than 500, curing of the flexible foam tends to be inadequate, whereby shrinkage is likely to take place, such being undesirable. If it exceeds 5,000, the elasticity of the foam tends to be inadequate. In the present invention, a polyoxyalkylene polyol having a molecular weight per hydroxyl group of less than 500 may be used, but such a polyoxyalkylene polyol is classified in the after-mentioned crosslinking agent in the present invention.

The polyol (A) is a polyol having at least two hydroxyl groups on the average. The polyol (A) may be a single use of one type or a mixture of at least two types, or may be a polyol produced by using such a mixture as an initiator, as will be described hereinafter. The average number of hydroxyl groups is preferably from 2 to 8, more preferably from 2 to 4, further preferably from 2.2 to 3.9, most preferably from 2.4 to 3.7. If the average number of hydroxyl groups of the polyol is less than 2, the foam tends to be too soft, and the compression set tends to deteriorate, and if the average number of hydroxyl groups exceeds 8, the foam tends to be hard, whereby the mechanical properties such as elongation, of the foam, tend to deteriorate, or the soundproofing performance tends to be impaired. The number of hydroxyl groups of the polyol (A) is the same as the number of hydroxyl groups in the initiator used for its production.

As the initiator to be used the production of the polyol (A), a compound having from 2 to 8 active hydrogen atoms, is preferred. For example, a bi- to octa-hydric alcohol, a polyhydric phenol or an amine is preferred. Specifically, a polyhydric alcohol such as ethylene glycol, propylene glycol, 1,4-butanediol, neopentyl glycol, dipropylene glycol, glycerol, trimethylolpropane, pentaerythritol, diglycerol, meso-erythritol, methyl glucoside, glucose, dextrose, sorbitol or sucrose, a polyhydric phenol such as bisphenol A, pyrogallol or hydroquinone, or an amine, such as a polyamine such as ethylenediamine, diethylenediamine, diaminodiphenylmethane, hexamethylenediamine or propylenediamine, or a condensed compound obtainable by a condensation reaction of such a polyamine with a phenol resin or a novolak resin, may be mentioned. Further, a compound which is a polyether polyol having a low molecular weight obtained by ring opening addition polymerization of a small amount of an alkylene oxide to the above-mentioned polyhydric alcohol, polyhydric phenol or amine and which has a molecular weight per hydroxyl group of from about 200 to 500, preferably from 200 to 350, may also be used. Such a compound preferably has a molecular weight of at most 1,200.

As the initiator, a compound having from 2 to 4 active hydrogen atoms is more preferred, and a bi- to tetra-hydric alcohol or a bi- to tetra-hydric low molecular weight polyether polyol is preferred. Among them, a polyol produced by using a tri- or higher hydric alcohol or low molecular weight polyether polyol as an initiator is preferred, since it is thereby possible to take a balance of the soundproofing properties, foaming stability and physical properties of the flexible foam, and it is preferred to employ such a polyol as at least a part of the polyol (A). These initiators may be used in combination as a mixture of two or more of them.

The alkylene oxide may, for example, be ethylene oxide, propylene oxide, butylene oxide or styrene oxide, and a combination of ethylene oxide and propylene oxide is preferred.

In a case where ethylene oxide and propylene oxide are to be combined, it is possible to employ a method wherein after ring opening addition polymerization of propylene oxide, ethylene oxide is ring-opening addition polymerized to form oxyethylene block chains at the terminals, a method (hereinafter referred to as random addition) wherein a mixture of propylene oxide and ethylene oxide is ring-opening addition polymerized to form oxypropylene/oxyethylene random polymerized chains, a method wherein ethylene oxide is block ring-opening addition polymerized to the interior of the molecular chain, or a method wherein after random addition, ethylene oxide is ring-opening addition polymerized to form oxypropylene/oxyethylene random polymerized chains in the interior of the molecule and oxyethylene block chains at the terminals.

It is particularly preferred to use one having from 5 to 25 wt % of polyoxyethylene block chains at the terminals, as at least a part of the polyol (A). Particularly preferably, such block chains may be used for from 50 to 100 mass % of the polyol (A).

As the catalyst for the ring opening addition polymerization of an alkylene oxide, an ordinary one may be employed. For example, potassium hydroxide, sodium hydroxide, cesium hydroxide, a phosphazenium compound, a boron trifluoride compound or a composite metal cyanide complex may, for example, be employed. Among them, it is preferred to use cesium hydroxide or a composite metal cyanide complex, whereby a polyol having a low unsaturated degree can be produced, and by using it a flexible foam having proper air flowability can be produced.

The polyol (A) may contain fine polymer particles dispersed in the polyol. Fine polymer particles are ones having fine polymer particles stably dispersed in a base polyol as a dispersing medium, and such fine polymer particles may be an addition polymerization type polymer or a polycondensation type polymer. For example, it may be an addition polymerization type polymer such as a homopolymer or copolymer of acrylonitrile, styrene, an alkyl methacrylate, an alkyl acrylate or other vinyl monomer, or a polycondensation type polymer such as a polyester, a polyurea, a polyurethane or a melamine resin. Among them, acrylonitrile, styrene or a copolymer thereof is preferred.

The content of the fine polymer particles is preferably from 0.1 to 10 mass %, more preferably from 1 to 10 mass %, in the polyol (A) The amount of the fine polymer particles is not required to be particularly large, and if it is too much, there will be no trouble other than the economical disadvantage. Further, the presence of the fine polymer particles in the polyol (A) is not essential, but the presence is effective for the improvement of the hardness, air flowability and other physical properties of the foam. Accordingly, the fine polymer particles are preferably present in an amount of at least 1 mass %, particularly at least 3 mass %. The method for dispersing the fine polymer particles may be a method of dispersing the fine polymer particles by using the polyol (A) as the base polyol, or a method wherein one having the fine polymer particles dispersed by using a part of the polyol (A) as the base polyol, is prepared and mixed with another polyol, and any other method may be employed.

Further, in the present invention, in a case where the polyol (A) contains the dispersed polymer particles, the amount of the polyol (A) or the after-mentioned polyol (p) is calculated based on the mass excluding the fine polymer particles.

Polyoxyalkylene Polyol (p)

In the present invention, at least a part of the polyol (A) is a polyoxyalkylene polyol (p) (hereinafter referred to also as the polyol (p)). The polyol (p) is a polyoxyalkylene polyol having at least two hydroxyl groups on the average and having a molecular weight (Mc) per hydroxyl group of from 1,800 to 2,800 and a total unsaturation value (USV) of at most 0.08 meq/g, among the above-mentioned polyols (A).

The molecular weight (Mc) per hydroxyl group of the polyol (p) is from 1,800 to 2,800, preferably from 1,850 to 2,500. If the molecular weight (Mc) per hydroxyl group is smaller than 1,800, the hardness of the flexible foam tends to be inadequate, and shrinkage is likely to take place, such being undesirable. If the above molecular weight exceeds 2,800, the elasticity of the foam tends to be inadequate.

The polyoxyalkylene polyol (p) has a total unsaturation value of at most 0.08 meq/g. If the total unsaturation value exceeds 0.08 meq/g, the air flowability of the flexible foam is likely to exceed 0.085 m$^3$/min, and the sound absorbing performance tends to be poor, such being undesirable. The total unsaturation value is more preferably at most 0.06 meq/g, further preferably at most 0.05 meq/g, most preferably at most 0.04 meq/g.

In order to obtain the polyol having such a total unsaturation value, it is preferred to employ cesium hydroxide or a composite metal cyanide complex, particularly preferably a composite metal cyanide complex, as the catalyst for ring opening addition polymerization of an alkylene oxide. As the composite metal cyanide complex catalyst, a known catalyst may be used. A complex containing zinc hexacyanocobaltate as the main component, is preferred, and one having an ether and/or alcohol as an organic ligand is further preferred. As the organic ligand, monoethylene glycol mono-tert-butyl ether or tert-butyl alcohol or glyme (ethylene glycol dimethyl ether) may, for example, be preferred.

The average number of hydroxyl groups in the polyol (p) is at least 2. The polyol (p) is a single use of one type or a mixture of polyols having molecular weights (Mc) per hydroxyl group of from 1,800 to 2,800 and total unsaturation values (USV) of at most 0.08 meq/g. Otherwise, it may be one produced by using such a mixture as an initiator. The average number of hydroxyl groups is preferably from 2 to 8, more preferably from 2 to 4, further preferably from 2.2 to 3.9, most preferably from 2.4 to 3.7. If the average number of hydroxyl groups of the polyol is less than 2, the foam tends to be soft, whereby the compression set tends to deteriorate, and if the number of hydroxyl groups exceeds 8, the foam tends to be hard, the mechanical properties such as elongation of the foam tend to deteriorate, or the soundproofing performance tends to be impaired.

Further, the polyol (p) is preferably one having polyoxyethylene block chains at the terminals, particularly preferably one having from 5 to 25 mass % of such block chains.

In the present invention, the proportion of the polyol (p) in the polyol (A) is preferably from 5 to 100 mass %. When from 5 to 100 mass % of the polyol (p) is contained, a flexible foam having proper hardness and proper air flowability can be obtained, and the strength of the foam will be improved. The proportion of the polyol (p) is preferably from 8 to 100 mass %, most preferably from 8 to 70 mass %. Further, as mentioned above, when the polyol (A) contains fine polymer particles, the proportion of the polyol (p) in the polyol (A) is calculated based on the mass excluding the fine polymer particles.

In the present invention, in addition to the polyol (A), other high molecular weight polyol such as a polyester polyol may be used. However, the amount of such other polyol is preferably at most 20 parts by mass, more preferably at most 10 parts by mass, per 100 parts by mass of the polyol (A). It is particularly preferred that no such other polyol is substantially used.

Organic Polyisocyanate Compound (B)

The organic polyisocyanate compound (B) to be used in the present invention is not particularly limited, and it may, for example, be a polyisocyanate of an aromatic type, an alicyclic type or an aliphatic type, having at least two isocyanate groups; a modified polyisocyanate obtainable by modifying such a polyisocyanate; or a mixture of two or more of such polyisocyanates. As a specific example, a polyisocyanate such as tolylene diisocyanate (TDI), diphenylmethane diisocyanate (MDI), polymethylenepolyphenyl isocyanate (so-called crude MDI), xylylene diisocyanate (XDI), isophorone diisocyanate (IPDI) or hexamethylene diisocyanate (HMDI), or a prepolymer modified product, an isocyanurate modified product, an urea modified product or a carbodiimide modified product of such a polyisocyanate may be mentioned. Among them, TDI, MDI, crude MDI or a modified product thereof is preferred.

The amount of the organic polyisocyanate compound is usually represented by an isocyanate index ((isocyanate equivalent)/(total equivalent of all active hydrogen in the polyol, the crosslinking agent, water, etc.)×100), and the amount of the polyisocyanate compound to be used in the present invention is preferably from 50 to 110, more preferably from 55 to 95, by the isocyanate index.

Blowing Agent (C)

In the present invention, the blowing agent (C) is not particularly limited, but it is preferred to use at least one blowing agent selected from water and an inert gas. As the inert gas, air, nitrogen or carbon dioxide may specifically be mentioned. As the blowing agent, it is particularly preferred to use water. The amount of such a blowing agent is not particularly limited, but in a case where water is to be used, it is preferably at most 10 parts by mass per 100 parts by mass of the polyol (A) (in a case where high molecular weight polyol is used in addition to the polyol (A), the total of the polyol (A) and such other high molecular weight polyol). Other blowing agents may also be used in proper amounts depending upon the demand for e.g. foaming magnification.

Catalyst (D)

When the polyol (A) is reacted with the organic polyisocyanate compound (B), a catalyst (D) is used. As such a catalyst (D), an amine compound or an organic metal compound may, for example, be mentioned.

With a view to preventing fogging of an automobile glass or with a view to preventing contamination (whitening) of a polycarbonate resin to be used in an automobile interior, a tertiary amine catalyst having a molecular weight of at most 500 and having a hydroxyl group in its molecule, is preferred. If the molecular weight exceeds 500, the reactivity of the hydroxyl group in the molecule with the organic polyisocyanate tends to deteriorate, such being undesirable.

The tertiary amine catalyst having a molecular weight of at most 500 and having a hydroxyl group in its molecule may specifically be N,N-dimethylaminoethoxyethoxyethanol, N,N-dimethylamino-6-hexanol, N,N-dimethylaminoethoxyethanol, a compound having 2 mol of ethylene oxide added to N,N-dimethylaminoethoxyethanol, or 5-(N,N-dimethyl)amino-3-methyl-1-pentanol, but it is not limited thereto.

Further, other tertiary amine catalysts may also be used, such as triethylene diamine, bis(2-dimethylaminoethyl)ether and N,N,N',N'-tetramethylhexamethylenediamine.

In the case of the amine catalyst, the amount of the catalyst to be used is preferably from 0.1 to 5 parts by mass per 100 parts by mass of the polyol (A) (when a high molecular weight polyol is used in addition to the polyol (A), the total amount of the polyol (A) and such other high molecular weight polyol). If the amount is more or less than this range, the reaction for curing of the isocyanate group with the active hydrogen group tends to be inadequate. The amount is particularly preferably from 0.5 to 3.0 parts by mass.

Further, as the catalyst, an organic metal compound may also be used. As such an organic metal compound, an organic tin compound, an organic bismuth compound, an organic lead compound or an organic zinc compound may, for example, be mentioned. For example, di-n-butyltin oxide, di-n-butyltin dilaurate, di-n-butyltin diacetate, di-n-octyltin oxide, di-n-octyltin dilaurate, monobutyltin trichloride, di-n-butyltin dialkylmercaptan or di-n-octyltin dialkylmercaptan may be mentioned. The amount of such an organic metal compound to be used is preferably less than 1.0 part by mass, particularly preferably from 0.005 to 1.0 part by mass, per 100 parts by mass of the polyol (A) (when other high molecular weight polyol is used in addition to the polyol (A), the total amount of the polyol (A) and such other high molecular weight polyol).

Others

In the present invention, a crosslinking agent may be used. As the crosslinking agent, a compound having at least two active hydrogen-containing groups selected from hydroxyl groups, primary amino groups and secondary amino groups, is preferred. The number of active hydrogen-containing groups is preferably from 2 to 8. Further, the molecular weight per active hydrogen-containing group of the crosslinking agent is preferably from 30 to less than 500, more preferably from 30 to 200. Two or more crosslinking agents may be used in combination.

As such a crosslinking agent, specifically, a compound such as ethylene glycol, propylene glycol, 1,4-butanediol, neopentyl glycol, 1,6-hexanediol, diethylene glycol, triethylene glycol, dipropylene glycol, glycerol, trimethylolpropane, pentaerythritol, diglycerol, monoethanolamine, diethanolamine, triethanolamine, bisphenol A, ethylenediamine, 3,5-diethyl-2,4(or 2,6)-diaminotoluene (DETDA), 2-chloro-p-phenylenediamine (CPA), 3,5-bis(methylthio)-2,4(or 2,6)-diaminotoluene, 1-trifluoromethyl-3,5-diaminobenzene, 1-trifluoromethyl-4-chloro-3,5-diaminobenzene, 2,4-toluenediamine, 2,6-toluenediamine, bis(3,5-dimethyl-4-aminophenyl)methane, 4,4'-diaminodiphenylmethane, m-xylylenediamine, 1,4-diaminohexane, 1,3-bis(aminomethyl)cyclohexane or isophoronediamine may, for example, be mentioned. Further, a low molecular weight polyoxyalkylene polyol may also be used. The crosslinking agent is used preferably in an amount of from 0.1 to 20 parts by mass, particularly preferably from 0.5 to 10 parts by mass, per 100 parts by mass of the polyol (A).

Further, a foam stabilizer is used in many cases to form good foams. As such a foam stabilizer, a silicone foam stabilizer or a fluorinated compound type foam stabilizer may, for example, be mentioned. Further, various known additives and adjuvants may be used as the case requires, such as an emulsifier, an aging preventive agent such as an antioxidant or an ultraviolet absorber, a filler such as calcium carbonate or barium sulfate, a plasticizer, a colorant, a flame retardant, an anti-fungus agent and a cell opener.

Air Flowability

The present invention is directed to a process for producing a flexible polyurethane foam, which comprises foaming a starting material composition (E) comprising a high molecular weight polyoxyalkylene polyol (A), an organic polyisocyanate compound (B), a blowing agent (C) and a catalyst (D) in a closed mold, and is characterized in that the air flowability of a flexible polyurethane foam obtained by foaming the starting material composition (E) in a thickness of 26 mm, is at most 0.085 m$^3$/min. Hereinafter, the flexible polyurethane foam obtained by foaming in a thickness of 26 mm will be referred to also as the 26 mm thick test sample. This sample is obtained by foaming by means of a closed mold having a thickness of 26 mm.

The air flowability is a numerical value measured by the method in accordance with JIS K6400 method B (1997). By using the starting material composition (E) which, when formed into the 26 mm thick test sample, has an air flowability of at most 0.085 m$^3$/min, it is possible to obtain a flexible polyurethane foam which is excellent in the sound absorbing performance in a low frequency region which used to be inadequate by a conventional flexible polyurethane foam alone, without impairing the sound absorbing performance in the medium frequency region which used to be good. The air flowability when it is formed into the 26 mm thick test sample, is preferably at most 0.030 m$^3$/min, more preferably at most 0.025 m$^3$/min.

Characteristics

In the present invention, in a sound absorption measuring method by a vertical entry method of a flexible polyurethane foam obtained by foaming the starting material composition (E) in a thickness of 26 mm, the sound absorption characteristic at 500 Hz is preferably at least 0.3, and the sound absorption characteristic at 2,000 Hz is preferably at least 0.55.

The sound absorption characteristics can be measured by the method in accordance with JIS A1405 method (1963). If the sound absorption characteristic at 500 Hz is smaller than 0.3, the sound absorbing performance in the low frequency region tends to be inadequate, and as a sound-insulating material for an automobile, it will be obliged to use it in combination with another material. If the sound absorption characteristic at 2,000 Hz is smaller than 0.55, the sound absorbing performance in the medium frequency region tends to be inadequate, whereby it tends to be poor in the performance as a soundproofing material, particularly as a soundproofing material for automobiles.

More preferably, the sound absorption characteristic at 500 Hz is at least 0.35, particularly preferably at least 0.4. Likewise, the sound absorption characteristic at 2,000 Hz is preferably at least 0.57, particularly preferably at least 0.6.

Further, the F-type hardness of the flexible foam of the present invention is preferably at most 80. When the F-type hardness is at most 80, a good soundproofing effect can be obtained, and if the F-type hardness is more than 80, the soundproofing effect tends to be poor, such being undesirable. Further, the F-type hardness is preferably at least 40.

Further, the foam density of the flexible polyurethane foam of the present invention is preferably at most 120 kg/m$^3$ and is preferably from 60 to 120 kg/m$^3$. If the foam density exceeds this range, the mass of the flexible foam becomes large, such being not acceptable for weight reduction of automobiles in recent years, and if it is less than the range, the soundproofing effect tends to be low, such being undesirable. The foam density is particularly preferably from 80 to 100 kg/m$^3$. Further, the rebound resilience is preferably from 30 to 50%. If the rebound resilience exceeds this range, the energy attenuation of the foam tends to be low, and the acoustic characteristics tend to deteriorate, such being undesirable.

Molding Method

Molding of the flexible foam in the process of the present invention is carried out preferably by a method wherein using a low pressure foaming machine or a high pressure foaming machine, the starting material composition (E) is injected directly into a closed mold (i.e. a reaction injection molding method) or a method wherein the starting material composition is injected into a mold, which is then closed.

The high pressure foaming machine is preferably one wherein usually two liquids will be mixed. In such a case, the organic polyisocyanate compound is used as one of the two liquids, and a mixture of all starting materials other than the organic polyisocyanate compound (which is usually called a polyol system liquid) is used as the other liquid. In some cases, the catalyst or the foam stabilizer (which is usually employed as dispersed or dissolved in a part of the high molecular weight polyol) and the blowing agent may be made to be a separate component, so that the reactive mixture for injection is constituted by a total of at least three components.

The flexible foam of the present invention is produced usually by a cold curing method, but may be produced by a method other than the cold curing method, such as a method including a heating step.

EXAMPLES

Now, the present invention will be described in detail with reference to Examples, but it should be understood that the present invention is by no means restricted thereto.

The molecular weight (Mc) per hydroxyl group, the number of hydroxyl groups, the content of oxyethylene (EO) groups (unit: mass %) and the total unsaturation value (USV) (unit: meq/g), of each of polyols (p-1) to (p-2) and (A-1) to (A-5) and the polymerization catalysts used in Examples and Comparative Examples, are shown in Table 1. For the catalyst in Table 1, KOH represents a potassium hydroxide catalyst, CsOH a cesium hydroxide catalyst, and DMC a zinc hexacyano cobaltate/monoethylene glycol mono-t-butyl ether complex catalyst. Further, the measurement of the unsaturation value was carried out by the method in accordance with JIS K1557 method (1970). Polyol (p-1) was produced by subjecting PO to ring opening addition polymerization in the presence of DMC using, as an initiator a compound having a molecular weight of 1,000 obtained by ring-opening addition polymerization of propylene oxide (PO) to glycerol, and then subjecting EO to ring opening addition polymerization by means of KOH. Polyol (p-2) was produced by subjecting PO to ring opening addition polymerization in the presence of CsOH by using glycerol as an initiator, and then subjecting EO to ring opening addition polymerization. Polyol (A-1) or (A-5) was produced by subjecting PO to ring opening addition polymerization in the presence of KOH by using glycerol as an initiator, and then subjecting EO to ring opening addition polymerization. Polyol (A-2) was produced by subjecting PO to ring opening addition polymerization in the presence of KOH by using a mixture of glycerol and sucrose as an initiator, and then, subjecting EO to ring opening addition polymerization. Polyol (A-3) was produced by subjecting a mixture of PO and EO to ring opening addition polymerization in the presence of KOH by using glycerol as an initiator. Polyol (A-4) was produced by subjecting PO to ring opening addition polymerization in the presence of KOH by using glycerol as an initiator. Further, other starting materials are shown in Table 2.

TABLE 1

| Identification of polyol | Mc | Number of hydroxyl groups | Content of EO groups (mass %) | USV (meq/g) | Polymerization catalyst |
| --- | --- | --- | --- | --- | --- |
| (p-1) | 2333 | 3 | 16 | 0.015 | DMC |
| (p-2) | 2000 | 3 | 16 | 0.039 | CsOH |
| (A-1) | 1633 | 3 | 15 | 0.06 | KOH |
| (A-2) | 1600 | 4.75 | 15 | 0.06 | KOH |
| (A-3) | 1170 | 3 | 67 | 0.006 | KOH |
| (A-4) | 1000 | 3 | 0 | 0.05 | KOH |
| (A-5) | 2337 | 3 | 14 | 0.10 | KOH |

TABLE 2

| | |
| --- | --- |
| Catalyst (D-1) | Dipropylene glycol (DPG) solution of triethylenediamine (tradename: KAOLIZER No. 31, manufactured by Kao Corporation) |
| Catalyst (D-2) | DPG solution of bis-[(2-dimethylamino)ethyl]ether (tradename: TOYOCAT ET, manufactured by TOSOH Corporation) |
| Catalyst (D-3) | 1-Isobutyl-2-methylimidazole (tradename: NC-IM, manufactured by Sankyo Air Products) |
| Catalyst (D-4) | Reactive tertiary amine catalyst (tradename: TOYOCAT RX-21 manufactured by TOSOH Corporation) |
| Foam stabilizer | Silicone foam stabilizer (tradename: SRX-274C, manufactured by Toray Dow Corning Silicone) |
| Blowing agent | Water |
| Polyol (A-6) | Polymer-dispersed polyol having fine particles of acrylonitrile polymer (20 mass %) dispersed in a dispersant of polyol (A-1) (80 mass %) |
| Polyol (A-7) | Polymer-dispersed polyol having fine particles of acrylonitrile polymer (20 mass %) dispersed in a dispersant of polyol (p-2) (80 mass %) |
| Polyisocyanate (B-1) | Mixture of TDI (mixture of 2,4-TDI/2,6-TDI = 80/20 mass %)/crude MDI = 50/50 mass %. Content of NCO groups: 39.7 mass % (tradename: Coronate 1025, manufactured by Nippon Polyurethane Industry Co., Ltd.) |
| Polyisocyanate (B-2) | Modified MDI. Content of NCO groups: 28.9 mass % (tradename: Coronate 1120, manufactured by Nippon Polyurethane Industry Co., Ltd.) |
| Crosslinking agent (E-1) | Polyoxypropylene polyol having an average number of hydroxyl groups being 4.7 and a hydroxyl value of 450 mg KOH/g (content of EO groups: 0 mass %) |
| Crosslinking agent (E-2) | Glycerol |
| Crosslinking agent (E-3) | Triethanolamine |

Examples 1 to 11

The upper and lower mold temperature of an aluminum mold of 400 mm×400 mm×26 mm in height was raised to 60° C. Among the starting materials in the blend amounts as shown in Tables 3 and 4, a mixture of all starting materials other than the organic polyisocyanate compound (the polyol system liquid) and the organic polyisocyanate compound liquid were, respectively, adjusted to liquid temperatures of 25±1° C. A prescribed amount of the organic polyisocyanate compound liquid was added to the polyol system liquid, and the mixture was stirred and mixed for 5 seconds by a high speed mixer (3,000 rpm) and injected at room temperature into a mold and sealed and then foamed and cured to produce a flexible polyurethane foam. Three minutes later, the flexible foam was taken out from the mold and left to stand in a room adjusted to have a room temperature of 23° C. and a humidity of 50% for at least 24 hours, whereupon measurements of various physical properties were carried out. The results of such measurements are shown in Tables 3 and 4. The measurements of the physical properties of foams were carried out by the following methods, and the standards used for the measurements of the physical properties of the flexible foams are shown below. Examples 1 to 8 are Examples of the present invention, and Examples 9 to 11 are Comparative Examples. Further, in Tables 3 and 4, the numerical values in the columns for formulations show mass %.

The foam density (unit: kg/m³) and the air flowability (unit: m³/min) were measured by the methods in accordance with JIS K6400 Method B (1997), and the vertical entry sound absorption characteristic was measured by the method in accordance with JIS A1405 method (1963) by means of an apparatus: vertical entry sound absorption measuring tube model No. 4206, manufactured by Bruel & Kjaer, an analysis software: Winzac, manufactured by Nittobo Acoustic Engineering Co., Ltd., a power amplifier: A100a, manufactured by YAMAHA CORPORATION, and a microphone amplifier: Model No. 2691, manufactured by Bruel & Kjaer.

TABLE 3

| | Examples | | | | | | | |
|---|---|---|---|---|---|---|---|---|
| | 1 | 2 | 3 | 4 | 5 | 6 | 7 | 8 |
| Polyol (p-1) | 8 | 24 | 40 | 24 | 24 | | | 14 |
| Polyol (p-2) | — | — | — | — | — | 59.2 | 59.2 | |
| Polyol (A-2) | | | | | | | | 12 |
| Polyol (A-3) | 3 | 3 | 3 | 3 | 3 | 3 | 3 | 2 |
| Polyol (A-4) | | | | | | 18 | 18 | |
| Polyol (A-5) | 72 | 56 | 40 | 56 | 56 | | | 44 |
| Polyol (A-6) | 20 | 20 | 20 | 20 | 20 | | | 30 |
| Polyol (A-7) | | | | | | 14.8 | 14.8 | |
| Crosslinking agent (E-1) | | | | | | 8 | 8 | |
| Crosslinking agent (E-2) | | | | | | | | 1 |
| Crosslinking agent (E-3) | | | | | | | | 0.7 |
| Blowing agent | 2.35 | 2.35 | 2.35 | 2.35 | 2.35 | 2.35 | 2.35 | 3.5 |
| Catalyst (D-1) | 0.6 | 0.6 | 0.6 | 0.6 | 0.6 | 0.6 | 0.6 | |
| Catalyst (D-2) | 0.3 | 0.3 | 0.3 | 0.3 | 0.3 | 0.3 | 0.3 | 0.05 |
| Catalyst (D-3) | 0.3 | 0.3 | 0.3 | 0.3 | 0.3 | 0.3 | 0.3 | |
| Catalyst (D-4) | | | | | | | | 0.5 |
| Foam stabilizer | 0.4 | 0.4 | 0.4 | 0.4 | 0.4 | 0.4 | 0.4 | 1.0 |
| Isocyanate (B-1) (Index) | 83 | 83 | 83 | 90 | 100 | 83 | 90 | |
| Isocyanate (B-2) (Index) | | | | | | | | 85 |
| Thickness of sample (mm) | 26 | 26 | 26 | 26 | 26 | 26 | 26 | 26 |
| Foam density (kg/m³) | 98.0 | 95.7 | 94.6 | 92.9 | 91.7 | 89.0 | 85.0 | 81.1 |
| Surface density (kg/m²) | 2.58 | 2.49 | 2.45 | 2.42 | 2.48 | 2.23 | 2.08 | 1.98 |
| Mold temperature (° C.) | 60 | 60 | 60 | 60 | 60 | 60 | 60 | 56 |
| F-type hardness | 45 | 43 | 46 | 51 | 56 | 60 | 70 | 77 |
| Air flowability (m³/min) | 0.0218 | 0.0164 | 0.0113 | 0.0139 | 0.0100 | 0.0270 | 0.0290 | 0.0240 |
| Vertical entry sound absorbing characteristic | | | | | | | | |
| 500 Hz | 0.45 | 0.51 | 0.56 | 0.53 | 0.59 | 0.58 | 0.43 | 0.52 |
| 1000 Hz | 0.83 | 0.74 | 0.63 | 0.67 | 0.57 | 0.74 | 0.84 | 0.78 |
| 2000 Hz | 0.85 | 0.83 | 0.70 | 0.68 | 0.58 | 0.86 | 0.81 | 0.79 |
| 4000 Hz | 0.77 | 0.82 | 0.78 | 0.72 | 0.62 | 0.78 | 0.78 | 0.80 |

TABLE 4

| | Examples | | |
|---|---|---|---|
| | 9 | 10 | 11 |
| Polyol (A-3) | 3 | 3 | 3 |
| Polyol (A-5) | 80 | 80 | 80 |
| Polyol (A-6) | 20 | 20 | 20 |
| Blowing agent | 2.35 | 2.35 | 2.35 |
| Catalyst (D-1) | 0.6 | 0.6 | 0.6 |
| Catalyst (D-2) | 0.3 | 0.3 | 0.3 |
| Catalyst (D-3) | 0.3 | 0.3 | 0.3 |
| Foam stabilizer | 0.4 | 0.4 | 0.4 |
| Isocyanate (B-1) (Index) | 80 | 90 | 100 |
| Thickness of sample (mm) | 26 | 26 | 26 |
| Foam density (kg/m³) | 104 | 95.6 | 97.1 |
| Surface density (kg/m²) | 2.69 | 2.49 | 2.58 |
| Mold temperature (° C.) | 60 | 60 | 60 |
| F-type hardness | 40 | 44 | 50 |
| Air flowability (m³/min) | 0.0289 | 0.0229 | 0.0178 |
| Vertical entry sound absorbing characteristic | | | |
| 500 Hz | 0.25 | 0.26 | 0.28 |
| 1000 Hz | 0.65 | 0.68 | 0.71 |
| 2000 Hz | 0.99 | 0.99 | 0.97 |
| 4000 Hz | 0.78 | 0.77 | 0.84 |

The flexible foams obtained in Examples 1 to 8 show good sound absorbing performance, and particularly, the sound absorbing performance at 500 Hz (in a low frequency region) is good. Further, they show proper values with respect to the foam density and the F-type hardness. Whereas, Examples 9 to 11 tend to be inferior in the sound absorbing performance in the low frequency region.

INDUSTRIAL APPLICABILITY

The flexible polyurethane foam obtained by the present invention has improved sound absorbing properties in the low frequency region in the vicinity of 500 Hz and thus is suitable as a soundproofing material for buildings or vehicles. It is particularly useful as a soundproofing material for vehicles such as automobiles.

The entire disclosure of Japanese Patent Application No. 2003-327588 filed on Sep. 19, 2003 including specification, claims and summary is incorporated herein by reference in its entirety.

What is claimed is:

1. A process for sound proofing comprising disposing a layer of a flexible polyurethane foam between a sound source and an area to be sound proofed, wherein said flexible polyurethane foam is formed by a process comprising:

foaming a starting material composition (B) comprising a high molecular weight polyoxyalkylene polyol (A) having a molecular weight per OH group of 500 to 5000 and an average of 2 to 4 OH groups per molecule, an organic polyisocyanate compound (B), a blowing agent (C) and a catalyst (D) in a closed mold, wherein at least a part of the high molecular weight polyoxyalkylene polyol (A) is a polyoxyalkylene polyol (p) in an amount ranging from 8 to 70 mass % of all polyoxyalkylene polyol present, having at least two hydroxyl groups on the average and has a molecular weight (Mc) per hydroxyl group ranging from 1,800 to 2,800 and a total unsaturation value (USV) of at most 0.08 meq/g, and that the air flowability of a flexible polyurethane foam obtained by foaming the starting material composition (E) in a thickness of 26 mm, is at most 0.085 m$^3$/min, and wherein said flexible polyurethane foam, in a sound absorption measuring method which utilizes a method of vertical entry of a flexible polyurethane foam obtained by foaming the starting material composition (E) having a thickness of 26 mm, the sound absorption characteristic at 500 Hz is at least 0.3, and the sound absorption characteristic at 2,000 Hz is at least 0.55.

2. The process of claim 1, wherein the density of the flexible polyurethane foam is at most 120 kg/m$^3$.

3. The process of claim 1, wherein the high molecular weight polyoxyalkylene polyol (A) has at least two hydroxyl groups on the average and has a molecular weight (Mc) per hydroxyl group ranging from 500 to 5,000.

4. The process of claim 1, wherein the polyol (p) is a polyoxyalkylene polyol that is obtained by ring opening addition polymerization of an alkylene oxide in the presence of a composite metal cyanide complex catalyst or a cesium hydroxide catalyst, and an initiator.

5. The process of claim 1, wherein the blowing agent is water or an inert gas.

6. The process of claim 1, wherein the catalyst D, as an amine, which is present in an amount ranging from 0.1 to 5 parts by wt per 100 parts by wt. of polyol (A).

7. The process of claim 1, wherein polyol (p) has an unsaturation degree of at most 0.06 meq/g.

8. The process of claim 1, wherein said area to be sound proofed is an automobile interior.

* * * * *